(12) United States Patent
Papadopoulos et al.

(10) Patent No.: US 12,373,541 B2
(45) Date of Patent: Jul. 29, 2025

(54) DEVICE TYPE VERIFICATION VIA MOTION-BASED ATTESTATION OF USERS SCREEN TOUCH

(71) Applicant: iProov Limited, London (GB)

(72) Inventors: Panagiotis Papadopoulos, London (GB); Bruno Voigt Hoos, London (GB); Josselin Guillozet, Woodstock (GB); Gemma Bird, London (GB); Andrew Newell, West Sussex (GB)

(73) Assignee: i Proov Limited (GB)

( * ) Notice: Subject to any disclaimer, the term of this patent is extended or adjusted under 35 U.S.C. 154(b) by 239 days.

(21) Appl. No.: 18/231,462

(22) Filed: Aug. 8, 2023

(65) Prior Publication Data

US 2024/0152596 A1 May 9, 2024

Related U.S. Application Data

(60) Provisional application No. 63/382,363, filed on Nov. 4, 2022.

(51) Int. Cl.
*G06F 21/00* (2013.01)
*G06F 21/44* (2013.01)

(52) U.S. Cl.
CPC .................................. *G06F 21/44* (2013.01)

(58) Field of Classification Search
CPC ........................................................ G06F 21/44
See application file for complete search history.

(56) References Cited

U.S. PATENT DOCUMENTS

2022/0116415 A1* 4/2022 Burgis .................... H04L 67/51
2024/0094828 A1* 3/2024 Ionescu .................. G06N 20/10

* cited by examiner

*Primary Examiner* — Rodman Alexander Mahmoudi
(74) *Attorney, Agent, or Firm* — Oliver Strimpel

(57) ABSTRACT

Methods of verifying a genuine presence and identity of a user of a mobile device include analyzing a stream of data from sensors of the mobile device over a period spanning a user press of a button displayed on a touch screen of the device. Results of the analysis are used to distinguish a genuine user button press from a simulated event generated by device emulation software or other simulation tool. The presence and identity verification are determined in part by the results of the sensor stream analysis, optionally in conjunction with an analysis of biometric data captured by the mobile device when the press of a button on the device touch screen has been elicited. The biometric data may include capture of imagery of a user face or body part by a camera of the mobile device.

21 Claims, 6 Drawing Sheets

DEVICE TYPE VERIFICATION VIA MOTION-BASED ATTESTATION OF USERS SCREEN TOUCH

CROSS REFERENCE TO RELATED APPLICATION

This application claims right of priority to and the benefit under 35 U.S.C. Section 119(e) of U.S. provisional patent application Ser. No. 63/382,363, filed Nov. 4, 2022.

BACKGROUND

Browser software running on mobile devices such as smartphones and tablets are subject to abuse by attackers seeking to change, i.e., to spoof, the true characteristics and type of the mobile device. These attacks extend to the browser type, such as the browser vendor and version, as well as to the user's device as a whole, such as the operating system, camera names, and hardware equipment. A common means of effectuating such attacks is via the use of developer tools, such as the virtualized environments provided by mobile device emulator software running on non-mobile systems or via another simulation tool. Such tools can be abused to create virtual devices that attack specific application program interfaces (APIs) and platforms. Tools such as Android emulators running virtual machines offer a rich tool set for attackers targeting biometric authentication platforms, with the potential to make such platforms vulnerable to injection attacks.

To thwart such attacks, there is a need for methods that are able to intercept injection attacks seeking to spoof mobile platforms and browsers running on them. Methods of distinguishing genuine user activity originating on a mobile device from simulated and artificially-generated activity are needed.

SUMMARY

In general, the described methods and systems analyze a stream of data captured from sensors of a mobile device over a period spanning a user press of a button displayed on a touch screen of the device. Results of the analysis are used to distinguish a genuine user button press from a simulated touch event. The analysis may be used in conjunction with methods of user presence and identity verification that use biometric data of the user captured by the mobile device.

In general, in one aspect, a method of verifying a device type associated with a purported touch-screen event comprises: receiving signals associated with the purported touch-screen event; processing the signals to extract features of the signals that are informative as to the device type associated with the purposed touch-screen event; providing the extracted features of the signals to a machine learning classifier wherein the classifier has been trained on: a set of touch events generated by human users touching a mobile device equipped with a built-in touch screen; and a set of emulated touch events generated by humans using mobile device emulator software; based at least in part on output from the classifier, determining whether the received signals were generated by a human user touching a mobile device equipped with a built-in touch screen; and when the received signals are determined to have been generated by a human user touching a mobile device, issuing a verification that the device type associated with the purported user touch-screen event is a mobile device.

Various embodiments include one or more of the following features. The signals associated with the purported user touch-screen event include sensor signals from a purported mobile device equipped with a built-in touch screen. The sensor signals from the purported mobile device include signals from a purported accelerometer. The sensor signals from the purported mobile device include signals from a purported gyroscope. The sensor signals from the purported mobile device include signals from a purported magnetometer. The sensor signals from the purported mobile device signals include signals from the built-in touch screen of the purported mobile device indicating at least one of a touch radius and a touch location. The sensor signals from the purported mobile device signals include signals from the built-in touch screen of the purported mobile device indicating a touch tangential pressure. The sensor signals from the purported mobile device signals include signals from the built-in touch screen of the purported mobile device indicating a touch rotation angle. The sensor signals from the purported mobile device signals include signals from the built-in touch screen of the purported mobile device indicating a touch pressure change. The set of touch events generated by human users touching a mobile device equipped with a built-in touch screen were generated by human users using software executing within a browser running on a mobile device; and the received signals associated with the purported touch-screen event were output by a browser running on a mobile device. The set of touch events generated by human users touching a mobile device equipped with a built-in touch screen were generated by human users using an application executing natively on a mobile device; and the received signals associated with the purported touch-screen event were output by an application executing natively on a mobile device. The received signals were captured over a period of time sufficient to capture the user activity surrounding one or more events. The period of time is greater than 0.5 seconds and less than 10 seconds spanning the purported touch-screen event. The machine learning classifier is a computational neural network. The machine learning classifier is based on a set of heuristics. The set of simulated touch events was generated at least in part by a human user of device emulation software. The set of simulated touch screen events was generated at least in part by automation software executing in combination with device emulation software.

In general, in another aspect, a method of verifying a presence of a user of a mobile device comprises: on the mobile device: capturing imagery of the user using a camera built into the mobile device; capturing signals from one or more motion sensors built into the mobile device, wherein the signals are captured during a temporal interval spanning a touch-screen event; and sending the captured signals and the captured imagery to a remote server over a wide area network, wherein the remote server is configured to: receive the captured signals and captured imagery; process the captured signals to extract features of the signals that are informative as to the device type associated with a touch-screen event; provide the extracted features of the signals to a machine learning classifier wherein the classifier has been trained to distinguish touch events generated by human users touching a mobile device equipped with a built-in touch screen from touch events generated by a human user of mobile device emulator software; output from the classifier a determination with an associated confidence level that the touch-screen event was generated by a human user touching a mobile device equipped with a built-in touch screen; analyze the captured imagery; based at least in part on the confidence level output by the classifier and results of the analysis of the captured imagery, determine whether the touch-screen event was generated by a human user touching a mobile device equipped with a built-in touch screen; and if a determination is made that touch-screen event was generated by a human user touching a mobile device equipped with a built-in touch screen, issue a verification that the touch-screen event was generated by a human user touching a mobile device equipped with a built-in touch screen and sending the verification to the mobile device; if the verification is received from the server, enabling the user to proceed to a subsequent step of a transaction being performed on the mobile device; and if the verification is not received from the server, barring the user from proceeding to the subsequent step of the transaction being performed on the mobile device.

In general, in a further aspect, a method of verifying a presence of a user of a mobile device comprises: on the mobile device: capturing imagery of the user using a camera built into the mobile device; capturing signals from one or more motion sensors built into the mobile device, wherein the signals are captured during a temporal interval spanning a touch-screen event; processing the captured imagery to determine whether a human face is present; and sending the captured signals to a remote server over a wide area network, wherein the remote server is configured to: receive the captured signals; process the captured signals to extract features of the signals that are informative as to the device type associated with a touch-screen event; provide the extracted features of the signals to a machine learning classifier wherein the classifier has been trained to distinguish touch events generated by human users touching a mobile device equipped with a built-in touch screen from touch events generated by a human user of mobile device emulator software; output from the classifier a determination with an associated confidence level that the touch-screen event was generated by a human user touching a mobile device equipped with a built-in touch screen; based at least in part on the confidence level output by the classifier, determine whether the touch-screen event was generated by a human user touching a mobile device equipped with a built-in touch screen; and if a determination is made that touch-screen event was generated by a human user touching a mobile device equipped with a built-in touch screen, issue a verification that the touch-screen event was generated by a human user touching a mobile device equipped with a built-in touch screen and sending the verification to the mobile device; if the verification is received from the server and the processing the captured imagery determined that a human face is present, enabling the user to proceed to a subsequent step of a transaction being performed on the mobile device; and if the verification is not received from the server, barring the user from proceeding to the subsequent step of the transaction being performed on the mobile device.

In general, in a yet further aspect, a computer program product comprises: a non-transitory computer-readable medium with computer-readable instructions encoded thereon, wherein the computer-readable instructions, when processed by a processing device instruct the processing device to perform a method of verifying a device type associated with a purported touch-screen event, the method comprising: receiving signals associated with the purported touch-screen event; processing the signals to extract features of the signals that are informative as to the device type associated with the purposed touch-screen event; providing the extracted features of the signals to a machine learning classifier wherein the classifier has been trained on: a set of touch events generated by human users touching a mobile device equipped with a built-in touch screen; and a set of emulated touch events generated by humans using mobile device emulator software; based at least in part on output from the classifier, determining whether the received signals were generated by a human user touching a mobile device equipped with a built-in touch screen; and when the received signals are determined to have been generated by a human user touching a mobile device, issuing a verification that the device type associated with the purported user touch-screen event is a mobile device.

In general, in another aspect, a system comprises: a memory for storing computer-readable instructions; and a processor connected to the memory, wherein the processor, when executing the computer-readable instructions, causes the system to perform a method of verifying a device type associated with a purported touch-screen event, the method comprising: receiving signals associated with the purported touch-screen event;

processing the signals to extract features of the signals that are informative as to the device type associated with the purposed touch-screen event; providing the extracted features of the signals to a machine learning classifier wherein the classifier has been trained on: a set of touch events generated by human users touching a mobile device equipped with a built-in touch screen; and a set of emulated touch events generated by humans using mobile device emulator software; based at least in part on output from the classifier, determining whether the received signals were generated by a human user touching a mobile device equipped with a built-in touch screen; and when the received signals are determined to have been generated by a human user touching a mobile device, issuing a verification that the device type associated with the purported user touch-screen event is a mobile device.

DETAILED DESCRIPTION

The methods described herein are aimed at verifying the true nature of a user device from which a click event has been received. More specifically, the methods may be used to determine whether the device is a mobile device such as a smartphone or tablet operated by a user of that device, or a system running mobile device emulator software or otherwise generating an artificial click event. The methods are transparent to the user as no actions from the user are elicited for the specific purpose of performing the verification. Instead, the verification is performed in the background in real time or near-real time when the user (or the purported user) is performing an action using a mobile device.

As used herein, the term "mobile device" refers to a device with a built-in touch screen and equipped with one or more sensors. The sensors may include an accelerometer, a gyroscope, a touch-screen-pressure sensor, a GPS sensor, and a magnetometer. Ubiquitous examples of such devices include smartphones running Android™, the operating system used by vendors such as Samsung® and Google®, and iOS, the operating system used by Apple® that runs on iPhones® and iPads®. Other examples of mobile devices include tablets and wearable devices such as watches.

When a user of a mobile device responds to a request to touch the screen, a touch-screen event occurs. As used herein the terms "touch-screen event," "touch event," and "click event" are used interchangeably. Thus, as used herein, the term "click event" when referring to the act of touching a mobile device touch screen does not imply the effectuation of a click of a mouse button or of a click mediated by another input modality. The click event may occur when the user touches a button displayed by an application running on the device. The application may be running natively on the mobile device, or the application may be implemented as software running within a web browser on the mobile device. In one application, software running within a browser on the mobile device in conjunction with software running on a server in data communication with the mobile device seeks to determine whether such click events are being received from a user of a mobile device who is actually present in real time and touching the device. The application seeks to distinguish such genuine click events from those generated by an artificial process, such as the use of device emulators hosted on non-mobile platforms.

Figure 1:
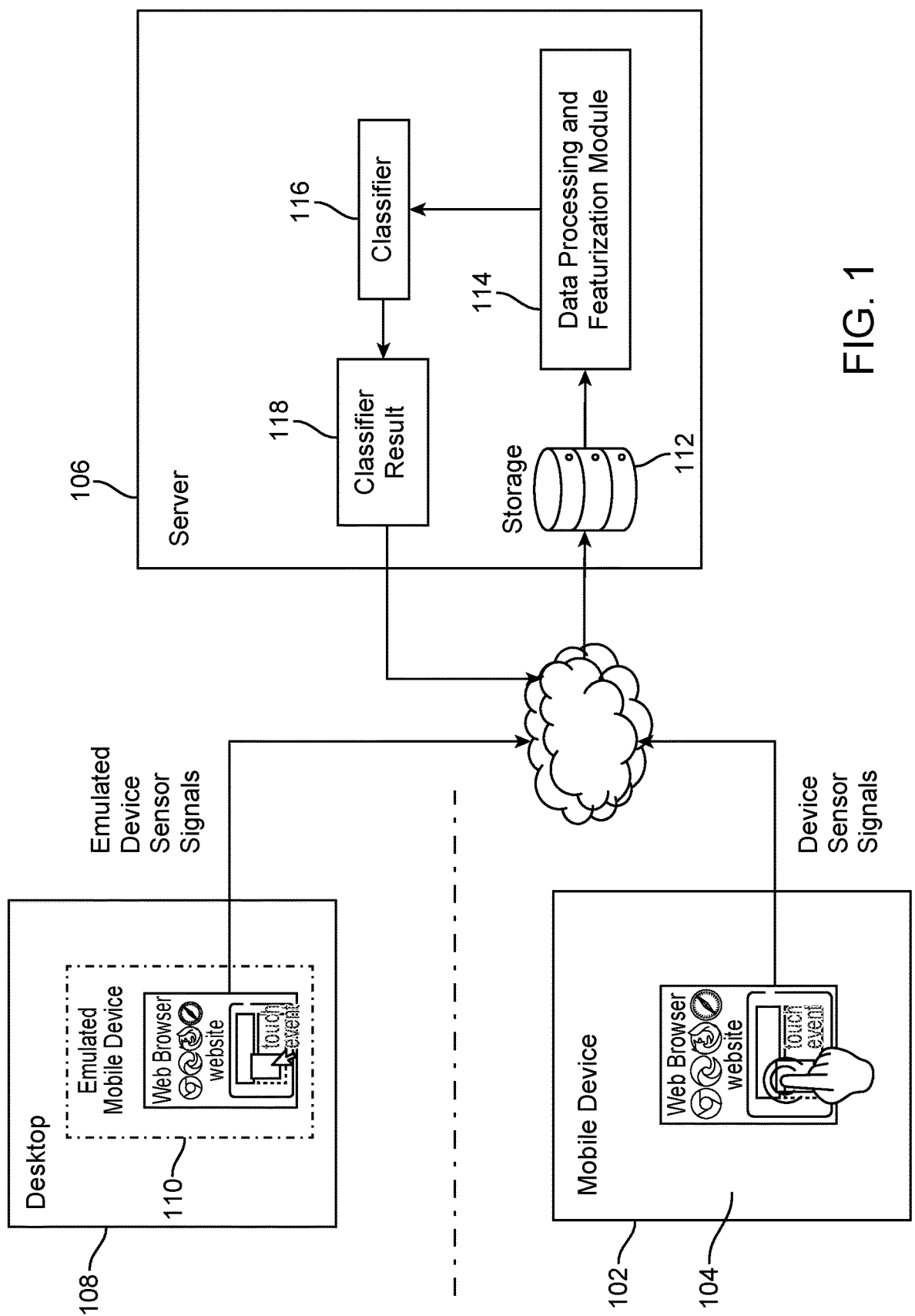
FIG. 1 is a high-level overview of a system for implementing the described method of using sensor data to distinguish a click event originating from a user of a mobile device from a simulated click event originating from a mobile device emulator.
Figure 2:
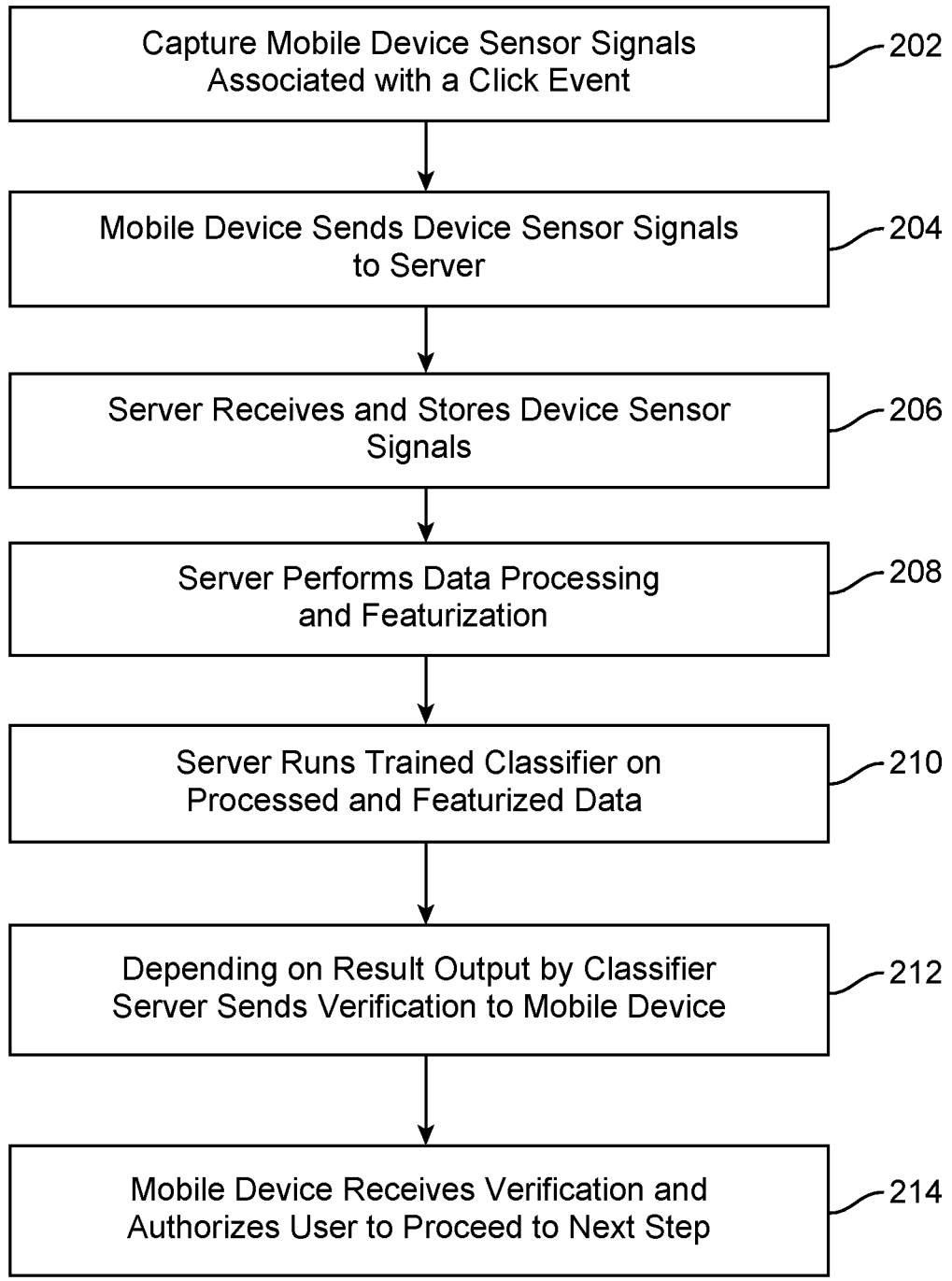
FIG. 2 is a high-level flow diagram showing the steps involved using sensor data to distinguish a click event originating from a user of a mobile device from a simulated click event originating from a mobile device emulator.

FIG. 1 is a high-level overview of a system for implementing the described methods and FIG. 2 shows a corresponding high-level flow diagram of the various steps involved. In step 202, sensor signals are captured on mobile device 102. The sensor signals are generated by sensors built into the mobile device. In some implementations, the sensor output signals (also referred to herein as the sensor stream) are captured continuously by setting a sliding window until a click event is detected. A click event on mobile device 102 is effectuated by a user of the device touching touchscreen 104. A capture time span starting before the actual touch and ending after the touch is retained for the subsequent verification process. In general, the time span is adjusted to capture user activity surrounding one or more click events. In various implementations, the capture time span of sensor output used for click verification is about 3 seconds with the click event occurring approximately in the middle of the captured period. In certain cases, the time span used for verification is one second or less and in other cases it is greater than 3 seconds up to a maximum of about 10 seconds. The sensors whose output is captured include one or more of an accelerometer, a gyroscope, a magnetometer, and the touch screen. When a click event is elicited by or otherwise associated with an application running within a browser on the mobile device, the browser receives the raw signals from the various sensors and combines and pre-processes them to provide signals indicating the device rotation rate, acceleration, and orientation. Further output from the browser may include output from the touch screen indicating touch location, touch pressure, touch radius, touch orientation, and tangential pressure. This data may also be used to help distinguish genuine mobile device sensor output from simulated output from a browser installed within an emulator.

In step 204, following the detection of a click event, the mobile device sends the sensor signal data for the period spanning the click event to the server. In step 206, server 106 receives signals purporting to have been generated by a click event caused by a human user touching the touch screen of a mobile device. The server may be a dedicated system in data communication with mobile devices and other systems via the internet, or it may be implemented in the cloud. The actual source of these signals may indeed be mobile device 102, which issued the signals when a mobile device user touched built-in touch screen 104. Or, the signals may have been generated by an attacker attempting to spoof the mobile device, for example by using system 108 running mobile device emulator software 110.

When the click event on a genuine mobile device is elicited or otherwise associated with an app running natively on the mobile device, the sensor output is not pre-processed by a browser. In contrast to what is output by a browser, an app running natively has full access to the raw sensor output without restriction. Furthermore, in the native app context, there are no privacy policies affecting precision and the app is able to customize the provided sensor output sampling rate. The described methods may be used both when the click event occurs within a browser or within a natively executing app.

Figure 3:
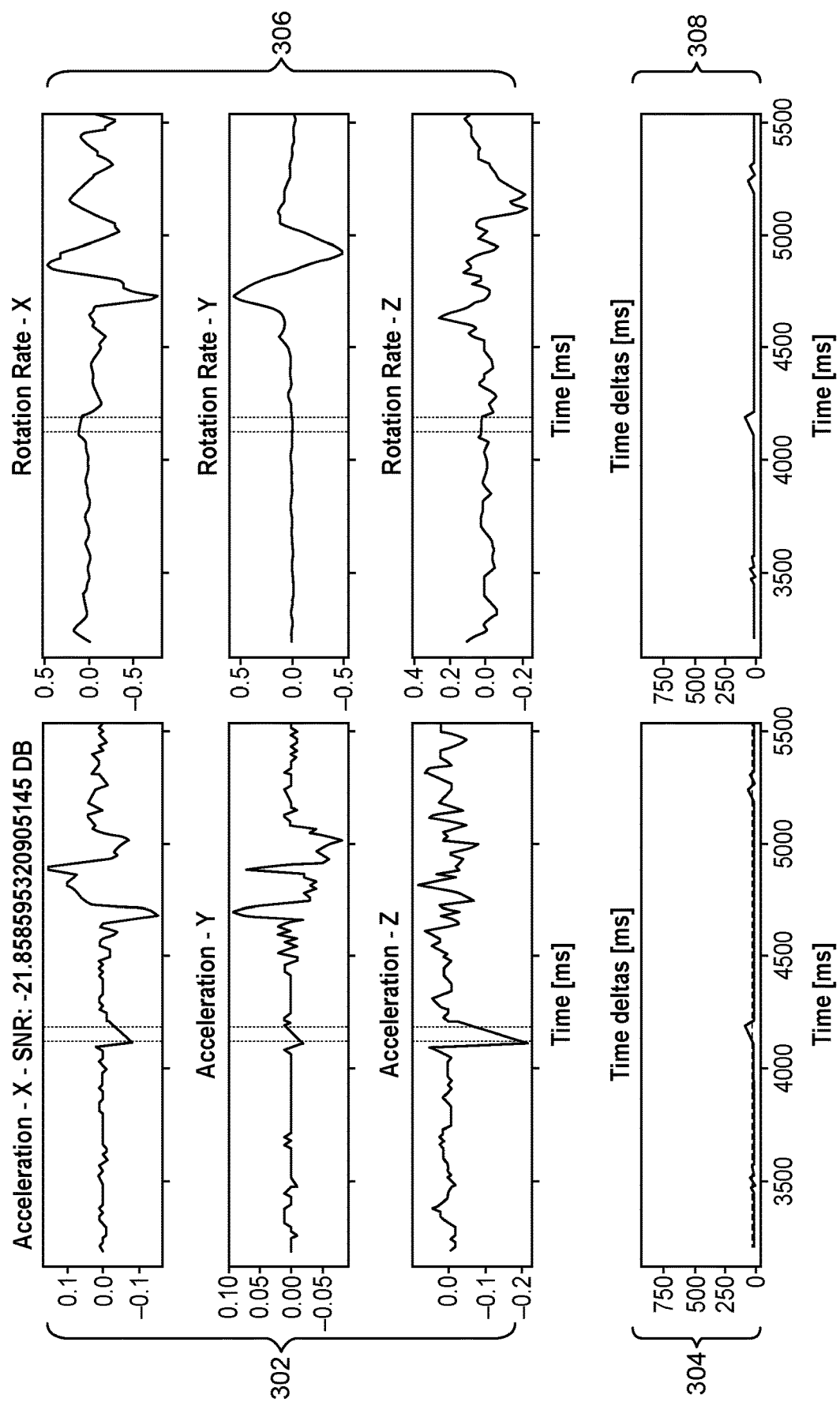
FIG. 3 illustrates an example of mobile device sensor output for a period spanning a click event.

FIG. 3 shows an example of sensor output data for a time period spanning a click event on a real mobile device. Graphs 302 are normalized plots of the x-, y-, and z-direction acceleration over a 2,500 millisecond period spanning a click event. The actual click event occurred during the period indicated by the dotted lines. The graphs show that the most pronounced acceleration was recorded in the z-direction with a positive acceleration (towards the user) just before the click and a large negative acceleration (away from the user) at the start of the click corresponding to the impact of the finger on the touch screen. Graph 304 shows the time increment captured by each sample. The rate of signal sampling may vary depending on the priority assigned to the subprocess that is responsible for obtaining samples. For example, on a mobile device, new motion samples may normally be created every 17 ms, but when the system is busy some samples might be missed and the corresponding temporal gap between successive samples may climb to 50 ms. In graph 304, the browser may be taxed when it needs to process a click event, resulting in the peak observed around the click event. Graphs 306 are normalized plots of the x-, y-, and z-axis device rotation rates and graph 308 shows the time interval between the capture of successive rotation rate samples and is analogous to graph 304. Graph 308 also shows a peak associated with the click event for reasons related to the priority of the process capturing the samples, as mentioned above for the acceleration data samples.

When an attacker attempts to spoof the mobile device by providing device type and browser identification data that appear to correspond to those of a mobile device running a browser, the signals received by server 106 (step 206) originate from system 108 where an attacker is running device emulator software 110. The emulator software is able to generate sensor signals that aim to simulate those that would be produced during the execution of a browser-based application running on a mobile device. Emulators can also emulate the signals that would be produced by an app running natively on a mobile device. Attacks based on the use of such emulators are referred to as injection attacks because they exploit virtualization to cover their methods of: (i) injecting imagery to a camera, which is reported as a physical camera; and/or (ii) injecting synthetically-generated sensor output from motion sensors that are reported as physical.

Figure 4:
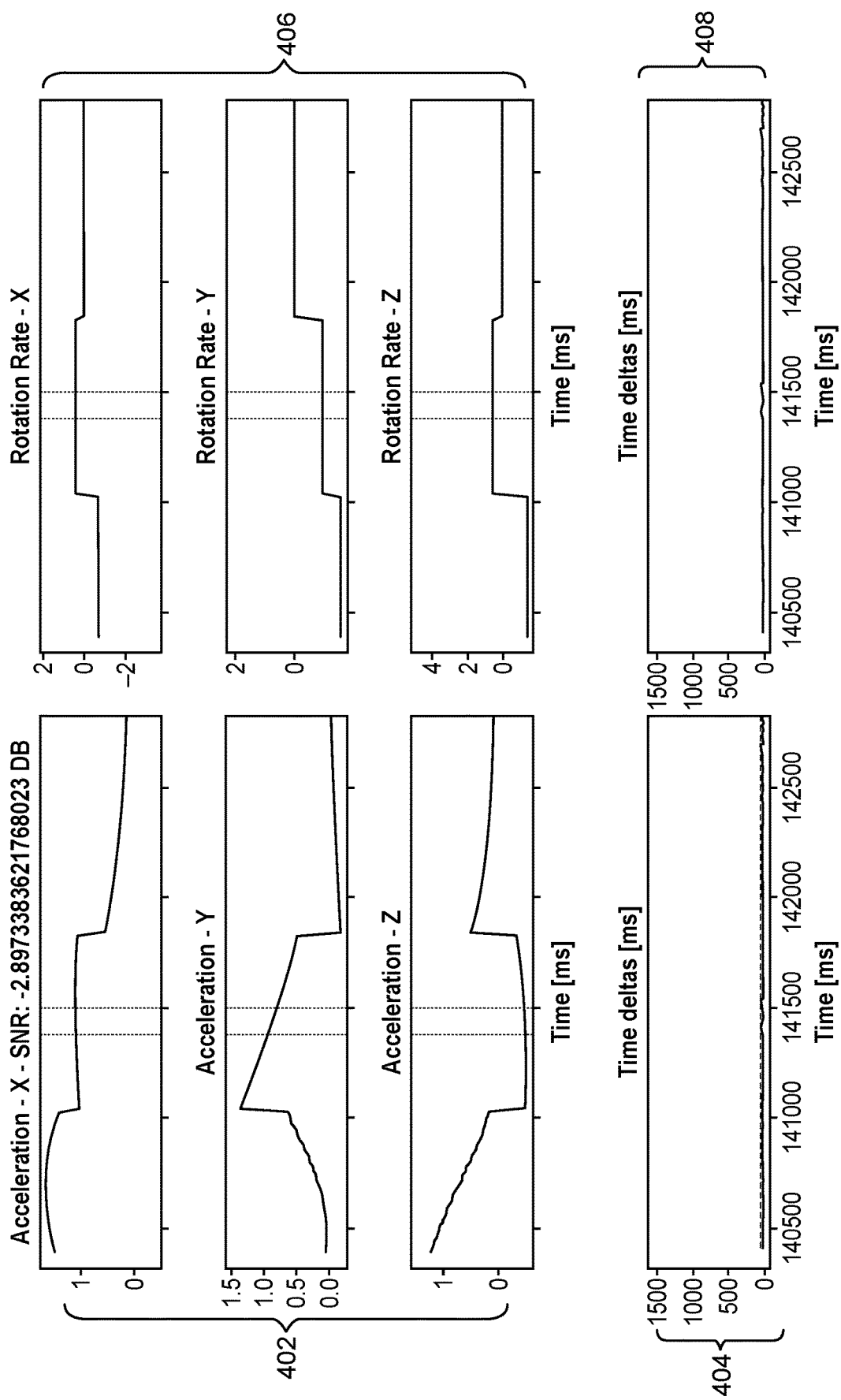
FIG. 4 illustrates an example of simulated mobile device sensor output spanning a simulated click event.

When an attacker uses a system running device emulation software, the output of the motion sensors can be simulated by abusing the developer tools provided by the device emulation software that enable users to simulate sensor output. The emulator captures the mouse clicks of the user and reports them as touch screen events to the browser. The graphs shown in FIG. 4 illustrate the kind of simulated sensor output that may be generated by an attacker using device emulation software hosted by a non-mobile computer system. The graphs correspond to the graphs of genuine mobile device sensor output shown in FIG. 3. The simulated x-, y-, and z-direction accelerations shown in graphs 402 show acceleration changes that are more coarse-grained than those of the genuine signals of graph 302, and they exhibit much less variation over timescales shorter than a few hundred milliseconds. Furthermore, the glitches in sampling rate that may occur when capturing sensor output data in a real mobile device do not generally occur in the context of an emulator. Thus, graph 404 has no peak during the simulated click event in contrast to that of graph 304. Similar distinctions between the mobile device case and the emulator case may be seen with regard to the rotation rate signals by comparing graphs 406 with 306 and graphs 408 with 308. Thus, the distinctions between sensor data as well as sampling rate from mobile devices on the one hand and emulators on the other may each provide data that can be used to help a classifier identify an attacker.

Server 106 receives and stores the sensor signals in storage 112 (step 206). Storage 112 may be physical or network-connected storage. The server includes a database that may use storage 112 to store its data. Examples of commercially available database software that may be used include mongoDB, Apache Cassandra. Apache CouchDB, and Redis. The original signals are stored for possible further training of the classifier.

Once stored, the received signals are processed by data processing and featurization module 114 executing on server 106 (step 208). During the data processing, data cleaning is performed to fix or remove incorrect, corrupted, incorrectly formatted, duplicate, incomplete or entirely missing data within a dataset. In addition, data transformation is performed to convert data from their raw format to a format that is appropriate for analysis. Following data clean-up and transformation, a set of features to be used as input to classifier 116 is extracted. This may include normalization, binning, and dimensionality reduction.

Classifier 116 is a software module that, based on a set of input signal features, is able to output a determination as to whether the signals were generated by a mobile device or by mobile device emulation software. The classifier may be a machine learning classifier, such as a neural-network-based model that has been trained using a corpus of data from a set of users. Other implementations of the classifier utilize heuristics. Such heuristics may be created by collecting and analyzing a corpus of data to extract characteristics of malicious as opposed to benign data. For example, a heuristic based on comparing the signals shown in FIGS. 3 and 4 may be:
    if time>t1 and time<t2 and
    accelerometerX peak>x and
    accelerometerY peak>y and
    accelerometerZ dip<z
      then conclude that the device is emulated.
Various thresholds of the heuristics, such as the values of x, y, and z in the above heuristic, may be adjusted based on statistical analysis of the results of applying the heuristic.

In the implementation illustrated in FIG. 1, the classifier is hosted by server 106. In other implementations, the classifier may be hosted on another platform, hosted in the cloud, or implemented partially or wholly as a cloud service (SaaS). In order to train the model to distinguish between signals received from a mobile device on which a genuine click event has been effectuated from signals received from a source that is simulating a mobile-user-generated click event, the model is trained using two sets of signals from purported click events. One set comprises sensor signals known to originate from a user's click action on a mobile device. The other set comprises signals generated artificially using one or more tools that enable a click event to be simulated. An example of such a tool is device emulation software hosted on a non-mobile system. Such software may be operated manually by a human user or may be at least partially automated to generate multiple simulated clicks upon request by a human user. The simulated click event may be generated when a user clicks a mouse or touches a touch screen using a simulation of a mobile device, which may include device emulation software or automation software running on any platform, mobile or non-mobile. The various methods of introducing simulated click events into the training corpus reflect the various ways in which an attacker may seek to inject artificial click events into a data stream to simulate a genuine mobile-user-generated click event. The number of genuine and simulated events in the corpus of data used to perform the training is adjusted in order to achieve a desired level of accuracy in the classifier results.

In step 210, the pre-processed and featurized data is provided as input to trained classifier, which then performs a classification based on the provided input. The classifier outputs result 118, which includes a determination as to whether the sensor signals received in step 206 originated from a click event on a mobile device or from a simulated click event generated by a user of device emulation software. A confidence level is associated with the classifier's determination. Subsequent events performed by a user of a mobile device may be evaluated in the light of the confidence level in combination with other outputs of the mobile device.

In the event that output result 118 is a determination that the signal source was a genuine mobile device, a verification signal is sent from the server back to the mobile device. Receipt of the verification from the server in combination with other information, such biometric data, login credentials, and account status, may then permit an application executing on the mobile device to proceed. The described methods are of particular value to any applications that require higher levels of security. Such applications include applications involving commercial transactions such as banking, shopping, online wallets, trading platforms, crypto-exchange apps, or other apps involving attestation of genuine identity or physical presence of a user.

In the event that output result 118 is a determination that the received signals were generated artificially, various courses of action may be taken. In some cases, no verification signal is returned, with a consequent effect on what actions the user is subsequently permitted to take. In other cases, further communication may be blocked entirely, a message may be sent back to the source of the received signals, or an application may be permitted to proceed with the imposition of additional challenges. Such actions may be deployed when the confidence level of the device verification result is low.

In various embodiments, the device sensor data is captured while a user of the device initiates and performs verification. The initiation and effectuation of user verification may involve the capture of biometric data. In certain use cases, the biometric data includes imagery captured by a user-facing camera built into the device. The captured imagery may include imagery of the user's face or of another body part, such as a palm or a finger. The capture of such data may occur prior to, at least partially concurrently with, or following the capture of the sensor data stream. For example, the initiation of sensor stream capture may occur before imagery is captured, and a click event may be used to initiate the capture of imagery on the device. In each of the described methods, one or both of the captured sensor data stream and captured biometric data may be processed locally on the mobile device or sent from the mobile device to a remote server for processing on the server. For cases where the data is sent to a server, a verification signal based on the data that was sent to the server is returned to the device. The processing of the sensor signals is described above and concerns the verification of the type of system that was used to generate a click event associated with the biometric data. The processing of the captured biometric concerns one or more of verifying the presence of a mobile device user and validating an identity presented by the user and may include methods taught by one or more of U.S. Pat. Nos. 9,075,975, 9,621,548, 9,773,180, 10,133,943, and 11,234,613, each of which is incorporated herein by reference.

Figure 5:
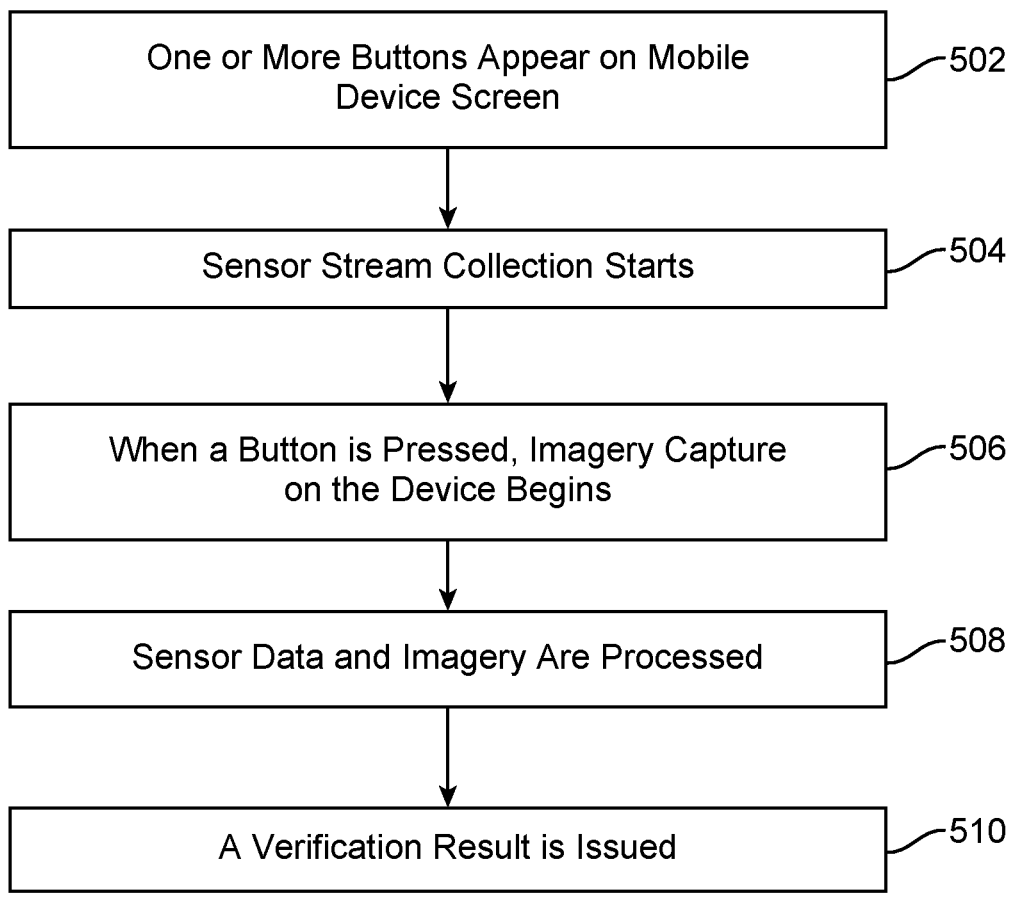
FIG. 5 is a high-level flow diagram illustrating the steps involved in user verification based on a combination of analyzing a captured mobile device sensor data stream associated with a click event and analyzing captured biometric data that is captured as part of the user verification process.

FIG. 5 is a high-level flow diagram illustrating the steps involved in user verification based on a combination of analyzing a captured mobile device sensor data stream associated with a click event and analyzing captured biometric data that is captured as part of the user verification process. The user verification process may itself be initiated by the click event.

In step 502, one or more buttons appear on the touch screen of the mobile device. As discussed below, some of the buttons may not be visible to the user. In step 504, the capture of the sensor data stream starts. The sensors include one or more of an accelerometer, gyroscope, magnetometer, and screen touch sensor. In step 506, when a button is pressed, capture of imagery on the device begins. As mentioned above, in various implementations the imagery capture may start before the click event actually occurs, for example when certain features of the sensor stream indicate user activity in response to the elicitation of the button press action. In step 508, the captured sensor data and the captured imagery are processed, with one or both being processed by a remote server or locally on the mobile device. The processing is performed either by (a) each stream being processed separately, and the output of the processing being combined into a single verification outcome, or (b) data from both streams being processed jointly. In case (a), two classifiers are deployed, one for the sensor data stream and one for the captured imagery, with the combination occurring on the outputs of the two classifiers. In case (b), the combination occurs before inputting to a single classifier trained to process the combination of sensor data and imagery. In step 510, a single verification result is produced and used to determine the subsequent course of an application running on the device.

In certain embodiments, the position of the button or other clickable (or touchable) entity is varied in accordance with a signal received at the mobile device from the server. Such variation may serve to thwart replay attacks in which an attacker replays a sensor data stream recorded from a previous touch-screen event. Varying the position of the clickable entity from one elicited click event to the next causes the associated sensor stream of the device to be different for each click event. Replay attacks fail when the data produced by the sensors are different for each verification attempt. In one implementation, the position of the button, within a certain range, is sent from the server to the device. The click event is then recorded, and the sensor stream is assessed for its authenticity using the methods described above. In addition, the sensor data stream is matched against the location of the button, which is predicted from the known location of the button. The touch location as determined by the touch screen sensor may also be included in the assessment for authenticity.

Figure 6:
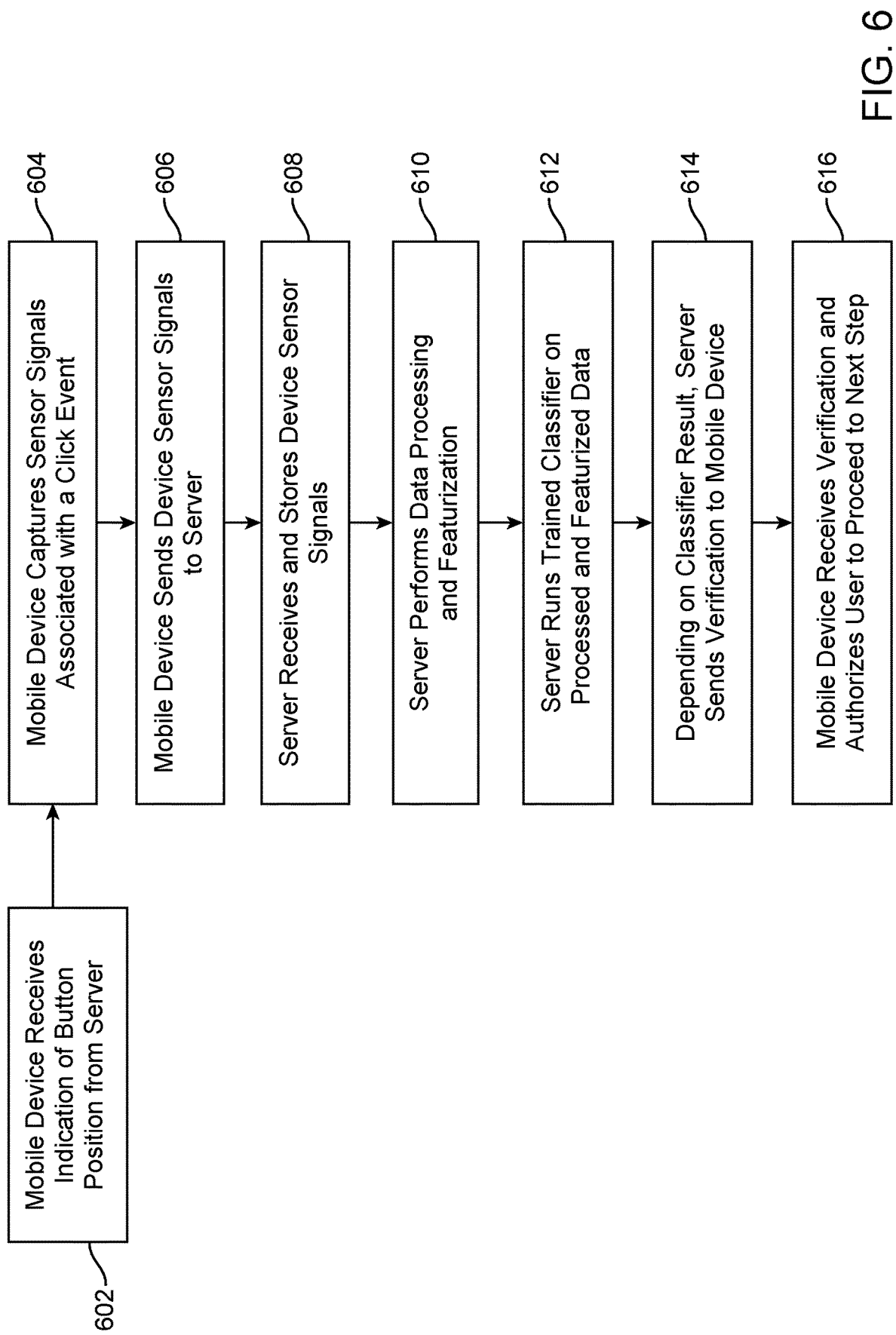
FIG. 6 is a high-level flow diagram illustrating the steps involved in user verification when the displayed location of a mobile device touch screen button is variable.

FIG. 6 is a high-level flow diagram illustrating the steps involved in user verification when the button location is variable. In step 602, the mobile device receives an indication from the server as to where the button or other clickable entity is to be located on the device touch screen. The mobile device accordingly displays the clickable entity to the user in accordance with the received indication. Steps 604, 606, 608 and 610 may then occur in a fashion analogous to those described above in connection with FIG. 2. In step 604, the touch location is included within the information captured from the mobile device touch sensor. In step 606, the sensor signals sent to the server include the touch location information. In step 612, the classifier may be based on a trained neural-network-based classifier or on another machine learning system. Such a system may be trained with multiple corpora of training data based upon the sensor output from mobile devices with varying button locations. In some implementations, a single training corpus is used in which sensor signals from a range of different button locations are combined and the classifier distinguishes genuine from emulated signals using aspects of the signal that are common to genuine mobile device click events. Steps 614 and 616 may proceed as described above in connection with FIG. 2.

In various embodiments, biometric data is used in combination with sensor signals in order to determine the true nature of the click event. In certain implementations, the biometric data includes imagery of the user that is captured during a period spanning the click event. Such imagery may include the face of a user. The appearance of the clickable entity on the mobile device is determined based in part on input to an application on the mobile device received from the device camera. In one application, the appearance of the button may then be made contingent upon the appearance of a face in front of the device and/or the appearance of a face that is looking at the screen of the device. The steps involved in such implementations include: (i) the detection of a face in front of the device camera or the detection of an appearance of a face that indicates that the user is looking at the camera, (ii) following detection, the display of a button on the device screen, and (iii) the recording and processing of the sensor stream as described above. In various embodiments, following the display of a button in step (ii), an indication of a display location for the button is received from the server, and the button is displayed accordingly, as described above. The processing required to perform step (i) is carried out either on the mobile device, or the captured imagery is sent to a server and the processing is performed on the server with the results of the detection sent back to the mobile device. In some cases, a positive detection of a face and/or a face looking at the screen is returned, and an application on the mobile device may only be permitted to proceed to a subsequent step if such a verification is received. In other cases, following processing of the captured imagery on the server, a response is sent back to the mobile device indicating whether a face (or a face looking at the screen) was detected or not detected.

In certain other embodiments, multiple buttons or clickable entities are used, for example when more than one button is provided on a device display in order to enable a user to select an option. In this case, two or more buttons or other clickable entities appear on the device screen. The sensor data stream is processed, and the authenticity of the user is established as described above, but in this case with a single sensor data stream including two or more click events within it.

In various embodiments, one or more buttons or clickable entities are used and only a subset is visible to the user. When certain buttons are invisible to the user, an emulator may attempt to detect the presence of such buttons and create a synthetic sequence of sensor data for an invisible button. However, a button that is invisible to the user is not clicked by the user and will therefore not be associated with a genuine click event. Processing of the sensor stream enables a determination as to whether a click event is associated with a genuine user pressing the visible button or an emulator in which a click of an invisible button has been artificially simulated. Such embodiments include (i) sending information regarding the number of buttons, locations of the buttons, and appearance of the buttons from the server to the mobile device, (ii) displaying one or more of the buttons in accordance with the information received from the server such that not all of the buttons are visible to the user, and (iii) recording and processing the sensor stream as described above using the information as to which buttons are visible to the user.

In some embodiments, the buttons or clickable entities include a pattern that has varying perceptual qualities to a human observer. The perceptual qualities of the buttons may or may not be perceivable by a human observer. In one example, a clickable entity is displayed with a low-contrast pattern. Such embodiments include (i) sending information regarding the number of buttons, the locations of buttons and the appearance of buttons from the server to the mobile device, including a pattern to be displayed on the button, (ii) displaying the buttons using the information from the server in such a way as that not all buttons are perceptible to the user, and (iii) recording and processing the sensor stream as described above using the information as to which buttons are perceptible to the user.

In other embodiments, the sensor data stream is compared to previous sensor data streams for a particular user to determine whether the click event arises from that particular user. Behavioral patterns relating to a click event may be used in this way as a biometric element. Such embodiments include: (i) displaying a button, (ii) capturing and sending the sensor data stream to the server and processing the sensor stream as described above, (iii) comparing the sensor data stream to a previously stored sensor data stream, or representation thereof, which is associated with a particular user, and (iv) issuing a successful verification if the sensor data stream is determined to have come from a genuine user and it has arisen from that particular user.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of verifying a device type associated with a purported touch-screen event, the method comprising:
   receiving signals associated with the purported touch-screen event;
   processing the signals to extract features of the signals that are informative as to the device type associated with the purported touch-screen event;
   providing the extracted features of the signals to a machine learning classifier wherein the classifier has been trained on:
      a set of touch events generated by human users touching a mobile device equipped with a built-in touch screen; and
      a set of simulated touch events;
   based at least in part on output from the classifier, determining whether the received signals were generated by a human user touching a given mobile device equipped with a built-in touch screen; and
   when the received signals are determined to have been generated by a human user touching the given mobile device, issuing a verification that the device type associated with the purported user touch-screen event is a mobile device.

2. The method of claim 1, wherein the signals associated with the purported user touch-screen event include sensor signals from a purported mobile device equipped with a built-in touch screen.

3. The method of claim 2, wherein the sensor signals from the purported mobile device include signals from a purported accelerometer.

4. The method of claim 2, wherein the sensor signals from the purported mobile device include signals from a purported gyroscope.

5. The method of claim 2, wherein the sensor signals from the purported mobile device include signals from a purported magnetometer.

6. The method of claim 2, wherein the sensor signals from the purported mobile device signals include signals from the built-in touch screen of the purported mobile device indicating a touch location.

7. The method of claim 2, wherein the sensor signals from the purported mobile device signals include signals from the built-in touch screen of the purported mobile device indicating a touch radius.

8. The method of claim 2, wherein the sensor signals from the purported mobile device signals include signals from the built-in touch screen of the purported mobile device indicating a touch tangential pressure.

9. The method of claim 2, wherein the sensor signals from the purported mobile device signals include signals from the built-in touch screen of the purported mobile device indicating a touch rotation angle.

10. The method of claim 2, wherein the sensor signals from the purported mobile device signals include signals from the built-in touch screen of the purported mobile device indicating a touch pressure change.

11. The method of claim 1, wherein:
   the set of touch events generated by human users touching a mobile device equipped with a built-in touch screen were generated by human users using software executing within a browser running on the mobile device; and
   the received signals associated with the purported touch-screen event were output by a browser running on the given mobile device.

12. The method of claim 1, wherein:
   the set of touch events generated by human users touching a mobile device equipped with a built-in touch screen were generated by human users using an application executing natively on the mobile device; and
   the received signals associated with the purported touch-screen event were output by an application executing natively on the given mobile device.

13. The method of claim 1, wherein the received signals were captured over a period of time sufficient to capture user activity associated with the purported touch-screen event.

14. The method of claim 1, wherein the machine learning classifier is a computational neural network.

15. The method of claim 1, wherein the machine learning classifier is based on a set of heuristics.

16. The method of claim 1, wherein the set of simulated touch events was generated at least in part by device emulation software.

17. The method of claim 1, wherein the set of simulated touch screen events was generated at least in part by automation software executing in combination with device emulation software.

18. A method of verifying a presence of a user of a mobile device, the method comprising:
   on the mobile device:
      capturing imagery of the user using a camera built into the mobile device;
      capturing signals from one or more motion sensors built into the mobile device, wherein the signals are captured during a temporal interval spanning a touch-screen event; and
      sending the captured signals and the captured imagery to a remote server over a wide area network, wherein the remote server is configured to:
         receive the captured signals and captured imagery;
         process the captured signals to extract features of the signals that are informative as to a device type associated with the touch-screen event;
         provide the extracted features of the signals to a machine learning classifier wherein the classifier has been trained to distinguish touch events generated by human users touching a mobile device equipped with a built-in touch screen from simulated touch screen events;
         output from the classifier a determination with an associated confidence level that the touch-screen event was generated by a human user touching a mobile device equipped with a built-in touch screen;

analyze the captured imagery;
based at least in part on the confidence level output by the classifier and results of the analysis of the captured imagery, determine whether the touch-screen event was generated by a human user touching a mobile device equipped with a built-in touch screen; and
if a determination is made that touch-screen event was generated by a human user touching a mobile device equipped with a built-in touch screen, issue a verification that the touch-screen event was generated by a human user touching a mobile device equipped with a built-in touch screen and sending the verification to the mobile device;
if the verification is received from the remote server, enabling the user to proceed to a subsequent step of a transaction being performed on the mobile device; and
if the verification is not received from the remote server, barring the user from proceeding to the subsequent step of the transaction being performed on the mobile device.

19. A method of verifying a presence of a user of a mobile device, the method comprising:
on the mobile device:
capturing imagery of the user using a camera built into the mobile device;
capturing signals from one or more motion sensors built into the mobile device, wherein the signals are captured during a temporal interval spanning a touch-screen event;
processing the captured imagery to determine whether a human face is present; and
sending the captured signals to a remote server over a wide area network, wherein the remote server is configured to:
receive the captured signals;
process the captured signals to extract features of the signals that are informative as to a device type associated with the touch-screen event;
provide the extracted features of the signals to a machine learning classifier wherein the classifier has been trained to distinguish touch events generated by human users touching a mobile device equipped with a built-in touch screen from simulated touch screen events;
output from the classifier a determination with an associated confidence level that the touch-screen event was generated by a human user touching a mobile device equipped with a built-in touch screen;
based at least in part on the confidence level output by the classifier, determine whether the touch-screen event was generated by a human user touching a mobile device equipped with a built-in touch screen; and
if a determination is made that touch-screen event was generated by a human user touching a mobile device equipped with a built-in touch screen, issue a verification that the touch-screen event was generated by a human user touching a mobile device equipped with a built-in touch screen and sending the verification to the mobile device;
if the verification is received from the remote server and the processing of the captured imagery determined that the human face is present, enabling the user to proceed to a subsequent step of a transaction being performed on the mobile device; and
if the verification is not received from the remote server, barring the user from proceeding to the subsequent step of the transaction being performed on the mobile device.

20. A computer program product comprising:
a non-transitory computer-readable medium with computer-readable instructions encoded thereon, wherein the computer-readable instructions, when processed by a processing device instruct the processing device to perform a method of verifying a device type associated with a purported touch-screen event, the method comprising:
receiving signals associated with the purported touch-screen event;
processing the signals to extract features of the signals that are informative as to the device type associated with the purposed touch-screen event;
providing the extracted features of the signals to a machine learning classifier wherein the classifier has been trained on:
a set of touch events generated by human users touching a mobile device equipped with a built-in touch screen; and
a set of simulated touch events;
based at least in part on output from the classifier, determining whether the received signals were generated by a human user touching a mobile device equipped with a built-in touch screen; and
when the received signals are determined to have been generated by a human user touching a mobile device, issuing a verification that the device type associated with the purported user touch-screen event is a mobile device.

21. A system comprising:
a memory for storing computer-readable instructions; and
a processor connected to the memory, wherein the processor, when executing the computer-readable instructions, causes the system to perform a method of verifying a device type associated with a purported touch-screen event, the method comprising:
receiving signals associated with the purported touch-screen event;
processing the signals to extract features of the signals that are informative as to the device type associated with the purposed touch-screen event;
providing the extracted features of the signals to a machine learning classifier wherein the classifier has been trained on:
a set of touch events generated by human users touching a mobile device equipped with a built-in touch screen; and
a set of simulated touch screen events;
based at least in part on output from the classifier, determining whether the received signals were generated by a human user touching a mobile device equipped with a built-in touch screen; and
when the received signals are determined to have been generated by a human user touching a mobile device, issuing a verification that the device type associated with the purported user touch-screen event is a mobile device.

* * * * *